United States Patent [19]

Vander Heyden

[11] 3,996,798

[45] Dec. 14, 1976

[54] OPEN CHANNEL FLOW METER

[75] Inventor: William H. Vander Heyden, Tulsa, Okla.

[73] Assignee: Badger Meter, Inc., Richmond, Calif.

[22] Filed: Jan. 12, 1976

[21] Appl. No.: 648,103

[52] U.S. Cl. .................................... 73/195; 73/215
[51] Int. Cl.² ......................................... G01F 7/00
[58] Field of Search ................. 73/194 R, 195, 197, 73/198, 215, 228

[56] References Cited
UNITED STATES PATENTS

| 3,638,490 | 2/1972 | Buettner | 73/194 |
| 3,681,988 | 8/1972 | McNulty | 73/194 |
| 3,908,458 | 9/1975 | Pannullo | 73/198 |

Primary Examiner—Herbert Goldstein
Attorney, Agent, or Firm—Lothrop & West

[57] ABSTRACT

In an open channel in which liquid flows, there are provided a first flow velocity measuring device and a second liquid level or height measuring device. At flows above a predetermined level the first and second devices are coupled to give a flow quantity readout. Below the predetermined flow level the height measuring device is automatically uncoupled from the velocity measuring device and is coupled to a computer in which the output of the height measuring device is substituted in a known formula relating height with flow quantity to give a flow quantity readout, the readouts for all levels being substantially continuous.

6 Claims, 1 Drawing Figure

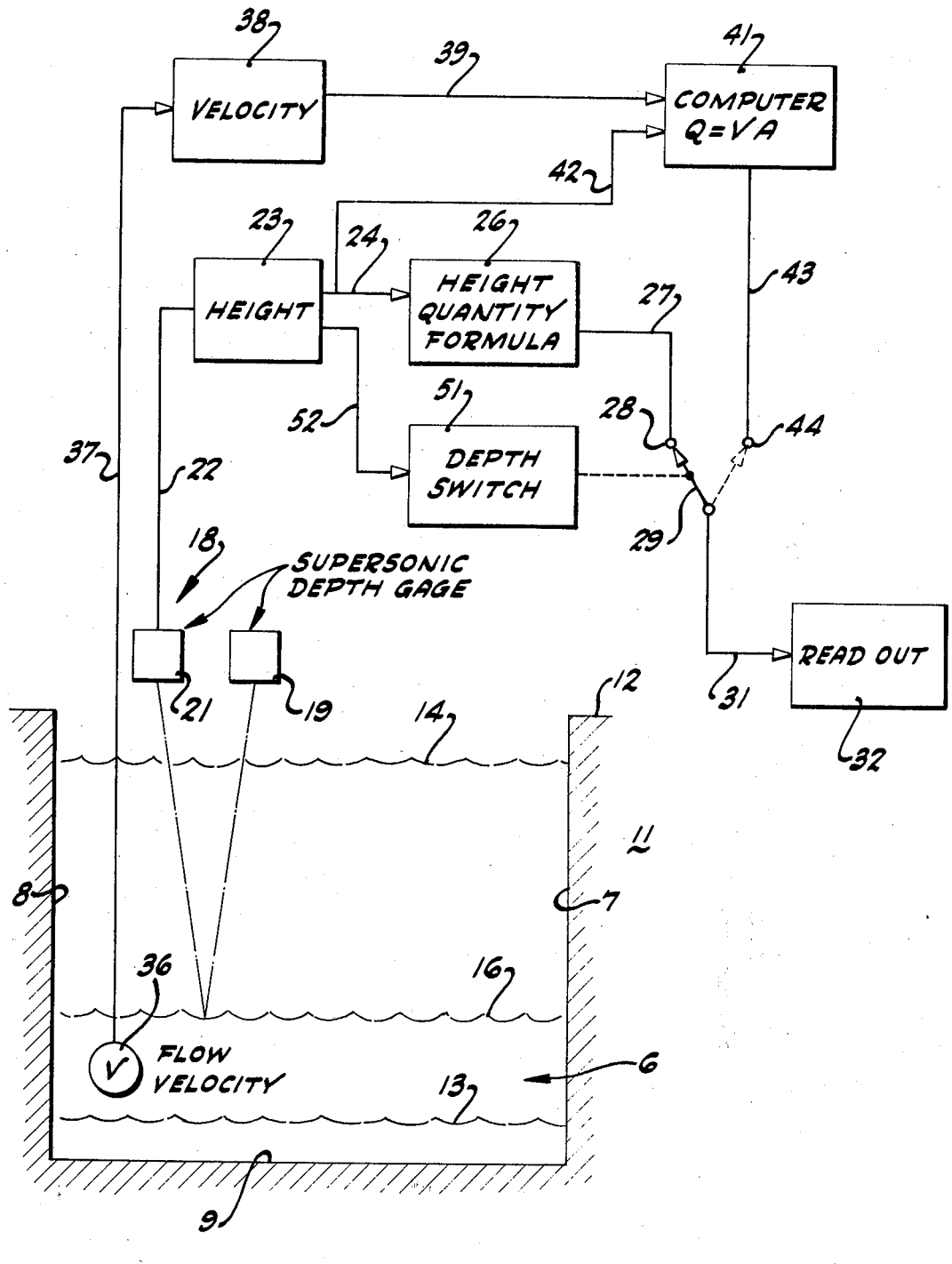

OPEN CHANNEL FLOW METER

In the measurement of liquid flowing in an open channel to determine the quantity of flow in the channel, various approaches may be utilized. For example, there is a recognized system of employing the varying liquid level or height as a factor for substitution in an empirical formula, such as the Manning formula or Kutter's formula, to give an acceptable approximation of the flow quantity. There are reasonably good ways of measuring actual velocity of flow in the channel. Even so, this approach requires some restrictions in measurement conditions and formula values in order to arrive at a reasonably accurate answer. The product of the velocity times the cross-sectional area of the wet portion of the channel also gives a value of flow quantity. Since the mentioned area in a channel of known cross-section varies with liquid level or height, the mentioned area is related to the liquid height through a known formula and may be evaluated through suitable computer means. It is relatively easy to make a good measurement of liquid height or level. A difficulty is that flow velocity measuring devices do not work well at low levels and in a channel, particularly due to bottom and side effects and partly because local flow may differ markedly from the average channel flow, because the device may be partly out of a representative flow and for other well-known reasons.

It is therefore an object of the invention to provide a liquid flow measuring device relying upon different inputs at different flow levels and effective over a relatively wide range of flows to afford an accurate flow quantity indication.

Another object of the invention is to provide an open channel flow meter that can readily be adapted to and installed for use in any open flow channel.

Another object of the invention is to provide an open channel flow meter utilizing some recognized types of equipment to arrive at an accurate result.

Another object of the invention is to provide an open channel flow meter that is automatically effective to give an accurate indication of quantity of flow both at low flow levels and at high flow levels.

A further object of the invention is in general to provide an improved open channel flow meter.

Other objects, together with the foregoing, are attained in the embodiment of the invention described in the accompanying description and illustrated in the accompanying drawing, in which:

The FIGURE is a diagram showing an open channel flow meter as it is arranged in accordance with the invention.

In a typical environment, there is provided a flow channel 6 having side walls 7 and 8 and a bottom wall 9 and arranged in a surrounding medium 11 below the surface 12 thereof. Within the channel, which may have any recognized cross-section, although a substantially rectangular cross-section is often encountered, there is liquid flow in varying amounts ranging from virtually empty; for example, at a low level 13, to virtually full at a high level 14. There are various and sundry intermediate levels indicated by a representative or predetermined level 16. It is understood that the level at any one time in the channel may be at any of the indicated heights above the bottom 9 and may fluctuate quickly between any of the possible levels.

In order to provide an appropriate reading of liquid height or level, there is located in connection with the channel 6 a depth gauge mechanism 18. This can be of any appropriate kind. It is particularly favorable to utilize a supersonic depth gauge in this environment. This type of device includes a sending unit 19 which emits supersonic energy, usually as pulses. These are reflected by the liquid surface, such as that at the predetermined level 16, and provide signals in a receiving unit 21. The depth gauge 18 senses the traverse time of the signals and from that determines the distance from the depth gauge (or from the bottom 9 or the surface 12) to the liquid level, such as at 16, or at 14, or even at 13. In short, the depth gauge is effective to measure depth throughout the total height of the channel.

The signal received in the unit 21 is transferred over a conductor 22 to a height transducer 23. Therein the received signal is translated into an indication of liquid height; that is, height of the instantaneous liquid level with respect to distance below the depth gauge 18 or the distance above the bottom 9. The height signal from the unit 23 is transmitted by a conductor 24 into a height formula computer 26. Provided in such computer is a formula for yielding quantity of flow as the result of a height measurement, such as the Manning formula or Kutter's formula. There can be some other, arbitrary formulation, dependent upon height, stored in the computer unit 26 for indicating flow quantity as a function of height. The height signal is substituted in the formula in the unit 26 and supplies a resulting flow quantity signal over a conductor 27 to a switch point 28. The signal then travels through a switch arm 29 and a conductor 31 to a suitable readout device 32 available to an observer.

Pursuant to the invention and to get an accurate indication of the flow velocity when the channel 6 is relatively full, a velocity pick-up 36 is installed within the open channel. This is a well-known device operating in response to and providing an analog to the flow velocity in its immediate vicinity. The velocity may vary greatly between different locations. This being true, it is important to position the device 36 at a favorable or velocity averaging location. Because of the effects of the side walls and bottom wall of the channel, and because of other boundary or marginal effects, it is advisable to locate the pick-up 36 at a substantial distance above the bottom 9 and spaced well away from the most nearly adjacent side wall 8. In an exemplary case, the velocity pick-up 36 is positioned at a location between about one-fourth of the depth of the channel to about one-third of the depth of the channel, as measured from the bottom.

The velocity pick-up 36 is joined by a connector 37 to a velocity transducer 38 effective to convert the signal from the pick-up for transmission over a conductor 39 to a computer unit 41. The computer 41 combines the signal provided by the velocity pick-up 36 with a height or flow level signal from the height transducer 23 transmitted through a conductor 42. The flow quantity Q is equal to the instantaneous velocity V times the instantaneous cross-sectional area A of the flowing stream. Since the mentioned area is related to the liquid height by a known formula, the computer 41 provides an evaluation of this known formula and combines the area value with the flow velocity to provide a flow quantity signal to a conductor 43 joined to a switch point 44. When the point 44 is contacted by the switch arm 29, the signal is provided through the conductor 31 to the readout 32.

While the depth or height or level signal from the gauge 18 is furnished for all channel flows at all levels, the velocity signal from the pick-up 36 has an unreliable accuracy below a predetermined level, such as the level 16. Consequently, there is particularly provided a depth switch 51 joined by a conductor 52 to the height signal unit 23. When the signal from the unit 23 indicates a depth below the predetermined level 16, the depth switch maintains the switch arm 29 in the illustrated position. Any output from the computer 41 is blocked and does not go to the readout 32. Only the signal from the height-formula computer 26 is then supplied to the readout 32. Correspondingly, when the height signal corresponds to a channel depth above the predetermined level 16, the switch arm 29 is moved from the point 28 and is transferred to the point 44. Then only the output from the computer 41 is supplied to the readout 32. While the depth switch 51 is shown and described as a mechanical switch for clarity and may be embodied just that way, usually an electronic switch is employed. The arrangement provides a continuous readout of flow quantity for all depths, and the readings are substantially continuous for all variations in liquid level.

What is claimed is:

1. A flow meter for use in an open channel having a known cross-section comprising means for detecting the level of liquid flowing in said channel and supplying a corresponding level signal, means for substituting said level signal in a known formula relating liquid level and quantity of liquid flow and providing a related first output, means for measuring the velocity of liquid flow in said channel and supplying a corresponding velocity signal, means for combining said level signal and said velocity signal and providing a related second output, a readout, a switch connecting said readout selectively to said first output and to said second output, and means responsive to said level signal for selectively operating said switch.

2. A device as in claim 1 in which said responsive means operates said switch at a predetermined level.

3. A device as in claim 2 in which said predetermined level is at about one-third to one-fourth the depth of said channel from the bottom thereof.

4. A device as in claim 2 in which said predetermined level is above said velocity measuring means.

5. A device as in claim 1 in which said readout is supplied through said switch from said first output when said liquid level is relatively low and is supplied through said switch from said second output when said liquid level is relatively high.

6. A device as in claim 1 in which said liquid level detecting means supplies said level signal simultaneously to said substituting means and to said combining means.

* * * * *